July 5, 1932.  H. C. BOSTWICK  1,866,390

SEGMENTAL DRUM

Filed May 6, 1931  2 Sheets-Sheet 1

Inventor,
H. C. Bostwick,
By Robert M. Pierson,
Attorney

July 5, 1932.  H. C. BOSTWICK  1,866,390
SEGMENTAL DRUM
Filed May 6, 1931  2 Sheets-Sheet 2

Inventor,
H. C. Bostwick,
By Robert M. Pierson,
Attorney

Patented July 5, 1932

1,866,390

UNITED STATES PATENT OFFICE

HENRY C. BOSTWICK, OF AKRON, OHIO, ASSIGNOR TO THE AKRON STANDARD MOLD CO., OF AKRON, OHIO, A CORPORATION OF OHIO

SEGMENTAL DRUM

Application filed May 6, 1931. Serial No. 535,455.

This invention relates to collapsible forms or mandrels, including those used in the manufacture of pneumatic tire casings, and it has for its object to provide improved means for holding the form segments in a fixed relation to each other, particularly in their outward or expanded positions, and for assisting in moving them to such positions.

Of the accompanying drawings, Fig. 1 is a rear elevation, partly in section on the line 1—1 of Fig. 3, showing a collapsible drum provided with a preferred form of my invention.

My invention is here shown as applied to a rotary tire band form or building drum of the type illustrated in my co-pending application Ser. No. 436,716, filed March 18, 1930, but may also be used on other collapsible forms. The drum or former of said prior application is expansible by the action of centrifugal force and it included certain springs which opposed the expanding movement of the segments, during the latter part of such movement, to assist in holding the free ends of the segments together in expanded relation. I have found that better results can be obtained with the latching device forming the subject of this application, said device being applicable to centrifugally expanded forms as well as to those which are positively expanded.

Figure 3:
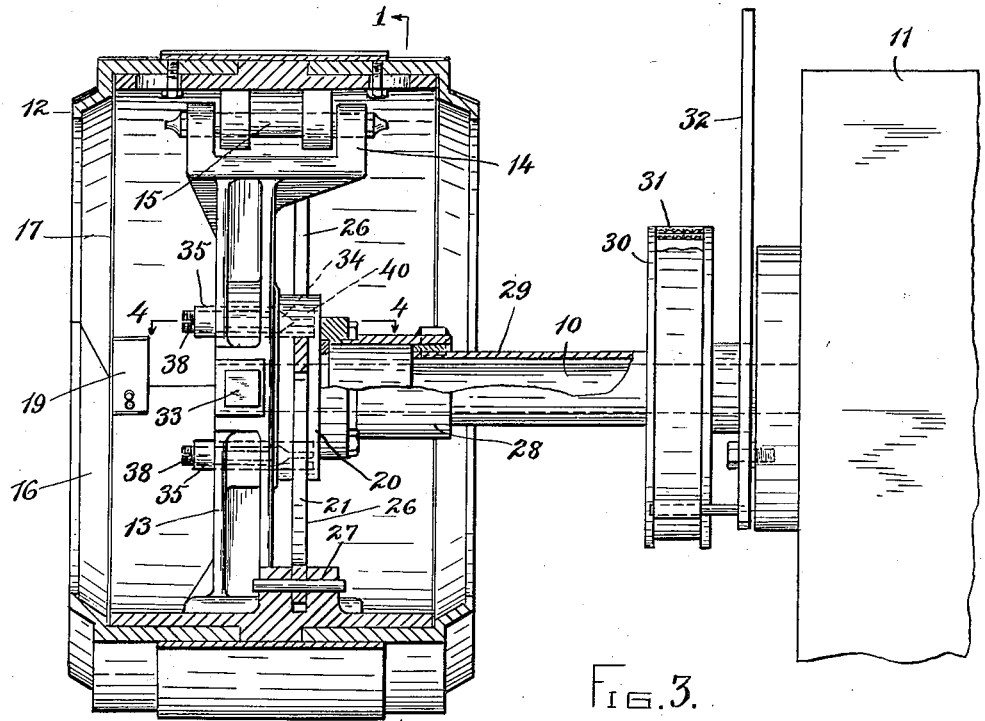
Fig. 3 is a longitudinal section on the line 3—3 of Fig. 1.

In the drawings, 10 is the rotary shaft of a tire-building machine, projecting horizontally from the casing 11 of said machine partly shown in Fig. 3. At the outer end of said shaft, and mounted to turn therewith, is located the collapsible form 12, shown in this case as a drum for building semi-flat tire bands.

To the outer end of shaft 10 is affixed a spider or segment support 13 having a pair of oppositely extending arms formed with forks 14 at their ends, each provided with a pair of pivot pins 15 on which are mounted hinge members of respective oppositely movable segments 16, 17. The four segments thus provided make up the complete periphery of the drum, and the free ends of the two opposite segments 17 overlap those of the segments 16 in a pair of beveled joints 18 which are held in radial alignment by means of internal stop plates 19 on the segments 16, underlapping the segments 17. Each of the segments is preferably made in parts which are axially adjustable on each other so that the length of the drum may be varied for different widths of tire bands as in my aforesaid prior application.

20 is a hub member or collar mounted coaxially with the hub of the spider 13, immediately in the rear of the latter and adapted to turn with respect thereto, said collar being formed with a pair of arms 21 each of which is pivotally connected at 22 with the inner end of a short toggle link 23 whose outer end is pivoted at 24 between ears on the inner side of the corresponding segment 16, said arm 21 being further pivotally connected at 25 with the inner end of a longer angular link 26 whose outer end is pivoted at 27 between similar ears on the inner side of the corresponding segment 17.

The inner toggle member or collar 20 is affixed to the forward member 28 of a hollow shaft which telescopes in non-turning relation upon the rear member 29 of said hollow shaft so that the collar can be axially shifted for drums of different lengths. The shaft section 29 carries a brake drum 30 surrounded by a brake band 31 having one end suitably fixed and the other end adapted to be actuated through a lever 32 by manual or other suitable power.

Figure 1:
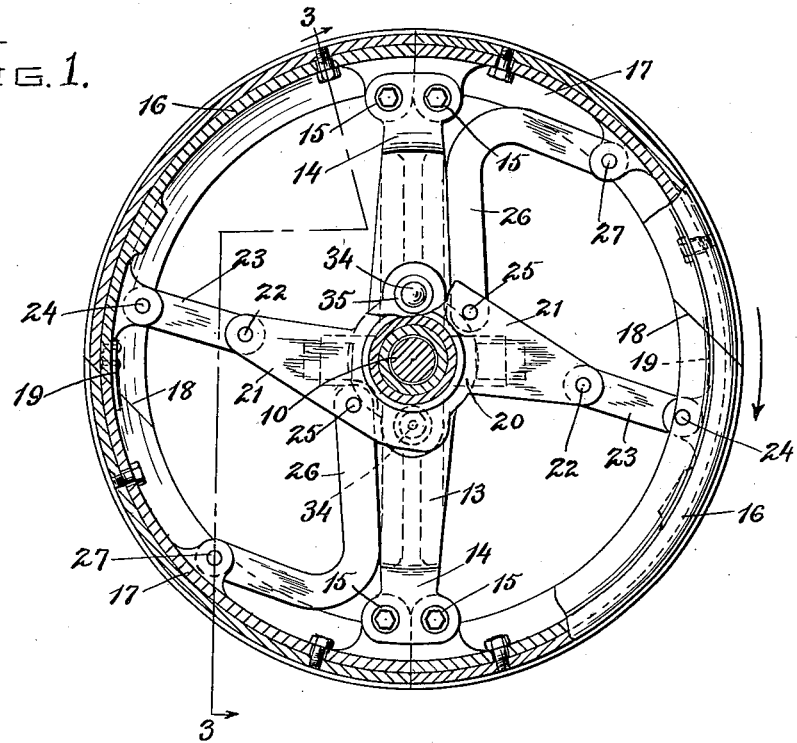
Figure 2:
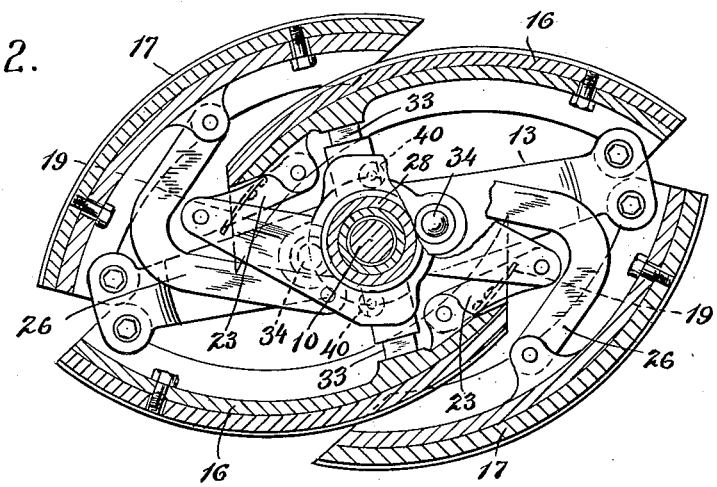
Fig. 2 is a similar view showing the drum in its collapsed condition.

The construction of the drum as thus far described is substantially the same as disclosed in my aforesaid application Ser. No. 436,716. In its operation, the drum rotates clockwise as viewed from the rear in the direction of the arrow shown in Fig. 1, and the component carcass plies, beads and rubber covering of the tire band may be successively applied and rolled down by means of suitable tools in the usual manner. When the band is completed, the drum may be collapsed by the power or momentum furnished by its own rotation, through the application of the brake band 31 to its drum 30, which imposes a retarding force upon the collar 20 in a direction opposite to the rotation of the periphery of the drum, causing the toggle links 23 and 26 to rock the segments 16, 17 inwardly to the position shown in Fig. 2, said segments being cushioned at the end of their collapsing movement by means of rubber bumpers 33 carried by the hub of the spider 13. The tire band is thus stripped from the form with the aid of centrifugal force acting on said band, and may then be readily removed from the form after the latter has come to rest. On starting the shaft 10 again in rotation, the form is automatically expanded to its operative shape by the action of centrifugal force, the outward movement of the segments turning the collar 20 and the hollow shaft upon the driving shaft 33 by means of the links 23 and 26. In the expanded condition of the drum, as seen in Fig. 1, each of the toggle pins 25 has passed over center or slightly beyond the radial line connecting the axes of the shaft 10 and pin 27, while each of the pins 22 is just short of the radial line between shaft 10 and pin 24, so that the ends of the segments 16 on their outward movement meet the ends of the segments 17 which have moved a slight distance inwardly at the completion of their outward movement to bring the ends together.

To assist in completing this latter movement bringing the ends of the segments together in the expanded condition of the form, I provide cam latching devices, here illustrated in a preferred form and location with respect to the other parts, although their form and location might be varied. At diametrically opposite points on the hub of the segment-supporting spider 13, parallel with the axis of drum rotation, are located a pair of latch plungers 34 each having a cylindrical stem slidingly mounted in a tubular casing 35 having a force fit in a hole in the spider hub, said casing having an end shoulder 36 in a counterbored recess of the hub. The stem of the latch is centrally bored to receive one end of a latch-projecting spring 37 whose other end abuts against a screw plug 38 which closes the forward end of the casing 35 and provides a means of adjusting the spring pressure.

The rear end of each latch plunger is formed with a conical nose 39 having a rounded point and adapted to be received in a complemental recess formed in a hardened socket member 40 sunk in a hole or recess in the toggle collar 20, the mouth edges of the casing 35 and socket member 40 being respectively flush with the adjoining faces of the hub spider and collar.

Figure 4:
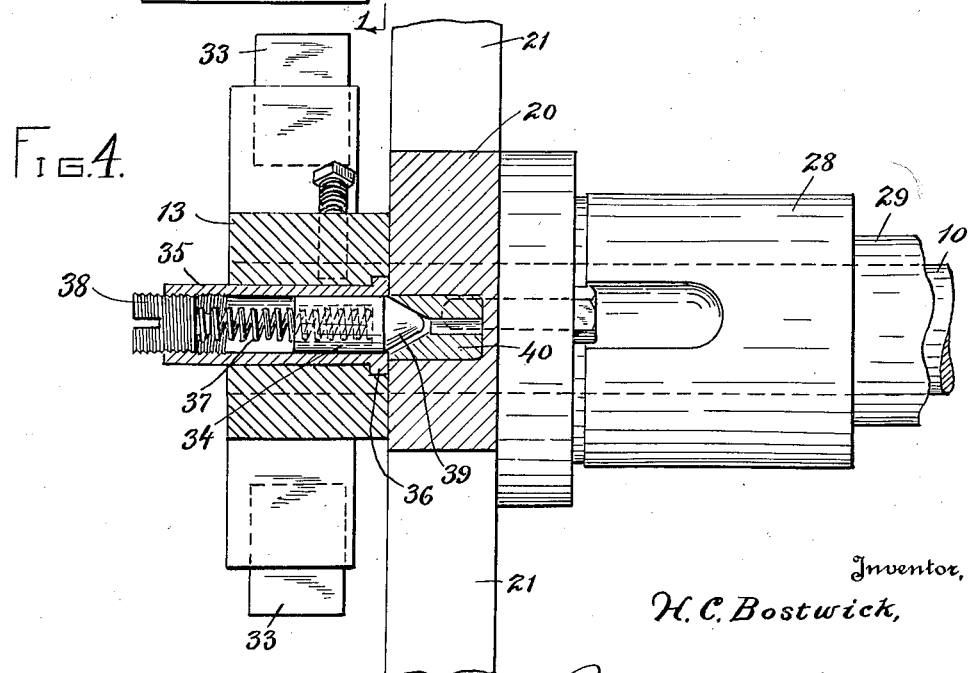
Fig. 4 is a plan view and section on the line 4—4 of Fig. 3.

Fig. 4 shows the relation of the latch parts when the ends of the segments 16, 17 are together in their expanded condition, the nose of the latch plunger not having quite reached the bottom of the socket recess so that a slight further take-up is allowed for possible wearing of the ends of the segments and other parts without causing looseness. The cam latches then supplement the action of centrifugal force in yieldingly holding the segment ends together and as said segment ends approach each other these latches assist in bringing the ends into contact. When the drum is collapsed, the action of the brake 30, 31 in retarding the collar 20 relatively to the spider 13 automatically retracts the latches 34 against the pressure of their springs through the wedging reaction of their conical ends with the complemental socket recesses, and the points of the latches are held retracted by the face of the collar 20 until the drum is again expanded.

I claim:

1. A segmental, collapsible, rotary form automatically expansible by centrifugal force, and means brought into action by the expansion of said form during the latter part of the expanding movement and inactive during the first part thereof for applying an additional force to aid in completing the expansion.

2. A collapsible form having a movable segment, and means displaceable by movement of said segment for yieldingly latching it in a fixed position.

3. A collapsible form having a pivoted segment, and cam means automatically retractible by collapsing movement of said segment for holding the latter in its expanded position.

4. A collapsible form comprising coacting segments whose ends meet in expanded position, and cam latching means retractible by collapsing movement of said segments for holding them in expanded relation.

5. A collapsible rotary form including pivoted segments automatically movable to expanded position by centrifugal force, and cam latching means automatically retractible by collapsing movement of said segments for holding them expanded.

6. A collapsible rotary form including a pivoted segment, a second pivoted segment whose free end overlaps the free end of the first segment in the operative positions of said segments, said second segment having an outward movement followed by a relatively small final inward movement in reaching its operative position, and yieldable cam latching means contributing to the production of said final inward movement of the second segment and serving to hold the ends of said segments together.

7. A segmental, collapsible, rotary form automatically expansible by centrifugal force, a yieldable latch which aids in holding said form expanded, and braking means for retracting said latch and collapsing the form by the latter's power of rotation.

8. A collapsible form comprising an internal support, form segments movable thereon, a member rotatable on said support for moving the segments, and a yieldable latch device coacting with said rotatable member and retractible thereby for holding the segments expanded.

9. A collapsible form comprising a rotary support, segments pivoted thereon, segment-operating toggles having a common member rotatable with respect to said support, and yieldable cam latching means mounted on one of said support and member and coacting with a part on the other for holding said toggles in the form-expanding position.

10. A collapsible form comprising a rotary shaft having a segment support fixed thereon a relatively-rotatable, coaxial, segment-operating collar, a latch-guiding casing carried by one of the last said members and containing a spring-projected cam latch plunger and a socket carried by the other member for receiving the end of said plunger when the toggle member is in its form-expanding position.

In witness whereof I have hereunto set my hand this 2nd day of May, 1931.

HENRY C. BOSTWICK.